W. H. CARRIER.
CENTRIFUGAL FAN.
APPLICATION FILED FEB. 7, 1914.
1,166,659.
Patented Jan. 4, 1916.
2 SHEETS—SHEET 1.
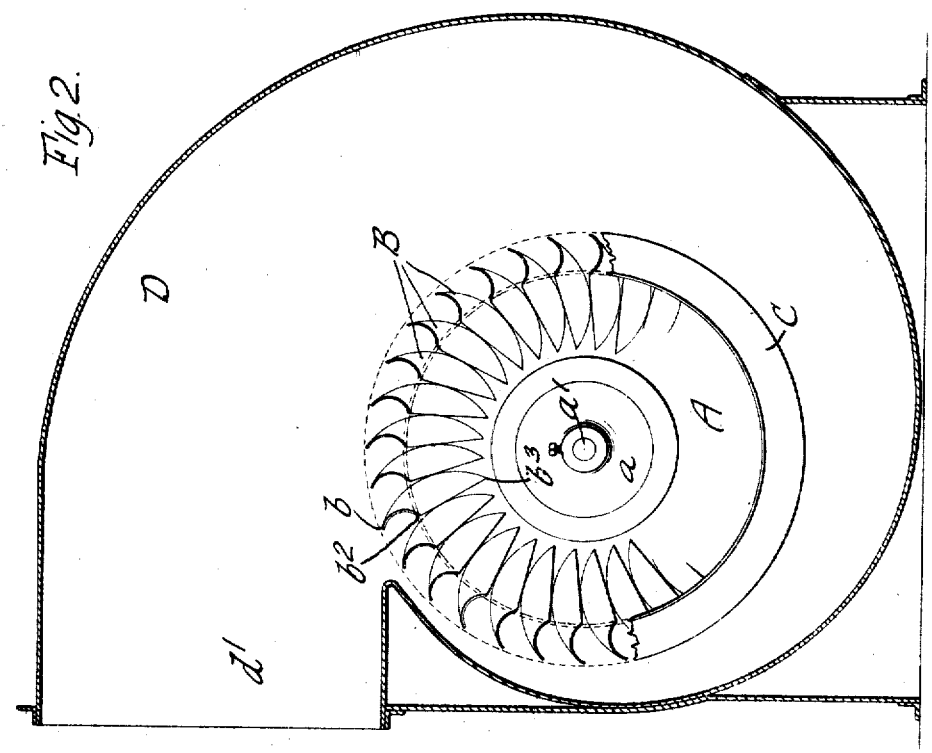
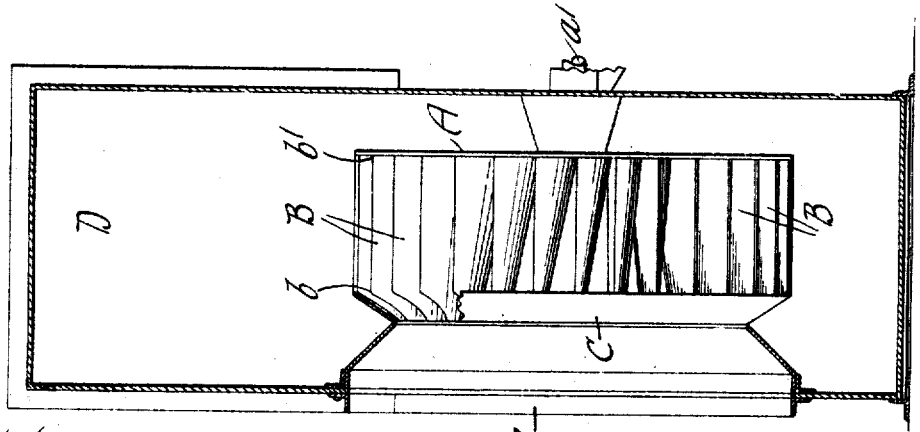

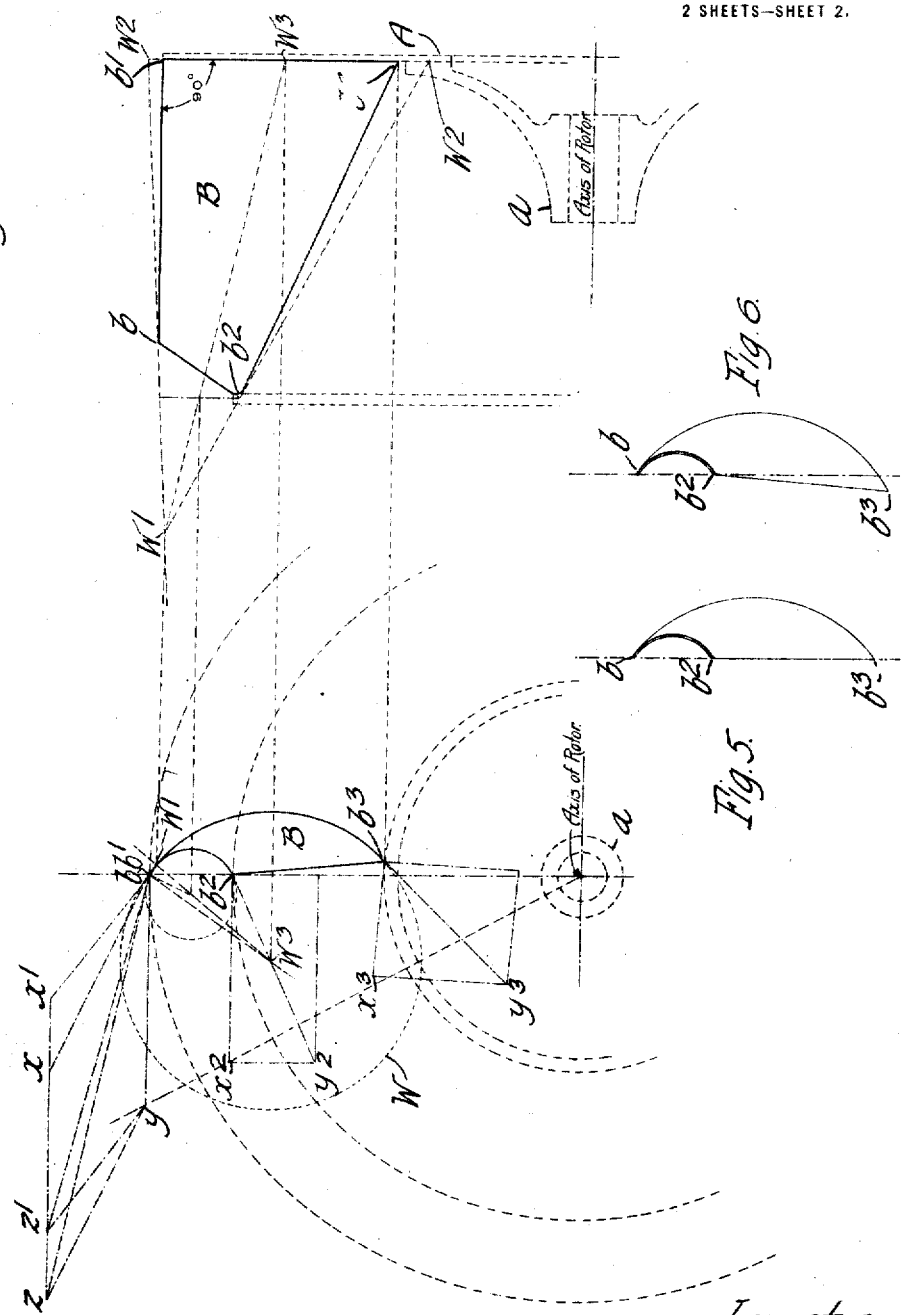

UNITED STATES PATENT OFFICE.

WILLIS H. CARRIER, OF BUFFALO, NEW YORK, ASSIGNOR TO BUFFALO FORGE COMPANY, OF BUFFALO, NEW YORK.

CENTRIFUGAL FAN.

1,166,659.     Specification of Letters Patent.     Patented Jan. 4, 1916.

Application filed February 7, 1914. Serial No. 817,151.

*To all whom it may concern:*

Be it known that I, WILLIS H. CARRIER, a citizen of the United States, residing at Buffalo, in the county of Erie and State of New York, have invented a new and useful Improvement in Centrifugal Fans, of which the following is a specification.

This invention relates to centrifugal fans of the multivane type which have numerous vanes or blades arranged in an annular series and surrounding a central intake chamber of relatively large diameter open at one end for the entrance of the air, which is discharged through the spaces or channels between the blades or vanes.

More particularly the invention relates to improvements in conoidal multivane fans of the kind disclosed in my copending application Serial No. 650,460, filed September 20, 1911, in which the blades have the form of a portion of the surface of a cone.

The object of the invention is to produce, by a new arrangement and proportioning of the blades, a multivane centrifugal fan which has the same mechanical advantages as the fan of said prior application and which at the same time is designed so as to equalize the combined static and kinetic effects produced along the entire length of the blades and thereby equalize the discharge of the air along the length of the blade and give the maximum efficiency; so as to give practically uniform axial and radial velocities of the air through the fan wheel; and so that the air is picked up by the blades with a minimum loss by shock or impact of the blades with the air, thereby increasing the pressure developed and reducing the power required to drive the fan.

In accordance with this invention the fan wheel is designed to produce its effect through the combined pressure-producing and velocity-producing actions of the impeller upon the streams of air guided between blades having concaved forward sides. The construction and principle of operation of the fan are in this respect quite different from the prior narrow blade type of multivane fans, in which the radial depth of the blades is small as compared with their axial length, and which depend chiefly on the kinetic energy imparted to the air, that is, the energy manifested alone in the velocity of the air passing through the channels between the blades. The fan disclosed and claimed in this application differs from these narrow blade fans in its performance characteristics, in that there is a considerable static pressure produced in the blades themselves, while in the narrow blade fan there is substantially none. This static pressure is produced through centrifugal force in excess of that required to produce the velocity through the channels between the blades, and the amount of centrifugal force produced depends upon the radial depth of the blades as compared with the diameter of the wheel. The present fan is preferably similar to that of said prior application in the employment of blades of conoidal form, but differs therefrom in the form and arrangement of the blades. The outer edge or tip of the blade preferably lies substantially in a cylindrical surface concentric with the axis of the wheel and by preference is coplanar with the axis of the wheel, while the inner edge, or heel, is preferably non-coplanar with the axis and is arranged with the inlet end thereof in advance of the opposite or disk end thereof. In order to equalize the volumetric discharge throughout the length of the blade, the angle of discharge at the tip of the blade increases from the inlet end toward the opposite end of the blade which is the angle between a tangent to the inner surface of the blade at the point of delivery and a tangent to the circle of revolution of that point on the side toward which the blade is moving, which gives a greater kinetic energy at the narrow inlet end of the blade sufficient to overcome the difference in static pressure, which is in favor of the wider opposite end of the blade. The angle of incidence, that is, the angle at which the moving blade strikes the air, also preferably increases gradually from the inlet toward the opposite end of the blade to compensate for the decreasing speed of the heel as it recedes from the inlet end and the increasing radial velocity of the air. The inlet area of the spaces between the blades is decreased toward the driving disk in such a manner as to give practically uniform axial and radial components of velocity at corresponding distances from the axis of the wheel, thus resulting in uniformity of volumetric discharge.

In the accompanying drawings: Figure 1 is a longitudinal sectional elevation of a fan showing one arrangement of blades embodying the invention. Fig. 2 is a sectional elevation of the fan as seen from the inlet end. Figs. 3 and 4 are respectively end and face elevations, enlarged, of one of the fan blades, showing by broken lines the development of the blade. Figs. 5 and 6 show slightly modified forms of blades.

The fan wheel consists of the blades and a suitable rotary carrier by which they are supported. The carrier preferably consists of a disk A provided with a hub $a$ by which it is secured to a drive shaft $a'$. The annular series of blades or vanes B are secured at one end to and project laterally from said disk, the opposite ends of the blades being held in place by suitable means, consisting preferably of a ring or band C to which the ends of the blades are attached. The blades can be attached to the disk A and band C in any suitable way.

Each blade is preferably of conoidal form, that is, it has the shape of a portion of the surface of a cone, and is arranged with its concaved side facing forwardly as regards the direction of rotation of the wheel, and its wide or base end is secured to the disk. The broken line circle W in Fig. 3, and the broken converging lines $W'-W^2$, Fig. 4, indicate the cone completed, $W'-W^3$ being the axis of the cone. The blades which surround or bound a central intake chamber increase in depth from the inlet to the disk end of the wheel, being of much greater radial depth at the disk end than at the inlet end. The outer edge or tip $b-b'$ of the blade preferably lies substantially in a cylindrical surface concentric with the axis of the wheel, coplanar with said axis, while the inner edge or heel $b^2-b^3$ lies substantially in a conical surface concentric with the axle of the wheel and is preferably, but not necessarily, non-coplanar with the axis, being arranged with the inlet end $b^2$ thereof leading the disk end. Instead of this preferred arrangement, the heel of the blade can, if desired, be coplanar with the axis of the wheel, as shown in Fig. 5, or it can be arranged with its disk end leading as shown in Fig. 6.

In order to equalize the total static and kinetic effects along the length of the blade, the angle of discharge at the tip of the blade is made to increase from the inlet toward the disk end of the blade, as indicated in Fig. 3, where $x-b-y$ indicates the discharge angle at the inlet end and $x'-b'-y$ the corresponding angle at the disk end. The corresponding kinetic effects produced at the two ends of the blade are indicated by the resultant velocity diagrams $x-b-y-z$ and $x'-b'-y-z'$, in which the resultant velocities at the inlet and disk ends are respectively $z-b$ and $z'-b'$. This varying discharge angle in a conoidal blade is secured by cutting the blade so that the tip edge $b-b'$ does not coincide with an element of the cone but extends at an angle to the elements of the cone intersecting the edge.

The variation of the angle of incidence at the heel of the blade, in order that the air may be picked up with a minimum loss by shock along the entire length of the heel of the blade, is effected in a similar manner by making the heel $b^2-b^3$ at an angle to instead of coincident with the elements of the cone intersecting said edge. If $x^2-b^2$, Fig. 3, represents the peripheral velocity of the heel at the inlet end $b^2$, then $b^2-y^2$ represents the radial velocity of the air at this point and $x^2-b^2-y^2$ represents the correct angle of incidence for the heel at the inlet end of the blade. Similarly if $x^3-b^3$ represents the peripheral velocity of the heel at the disk end $b^3$, then $b^3-y^3$ represents the radial velocity of the air at this point, and $x^3-b^3-y^3$ represents the correct angle of incidence of the heel at the disk end $b^3$.

D represents a casing in which the fan wheel is arranged to rotate when the fan is to be used for producing pressure. This casing is preferably of the volute shape shown, having an inlet opening or eye $d$ at the side thereof adjacent to the inlet end of the fan wheel, and a tangential discharge or outlet $d'$. The diameter of the inlet opening is preferably substantially equal to the internal diameter of the band C of the fan wheel. The fan wheel can be journaled to rotate in the casing in any suitable way. A casing of any other suitable construction may be used, or, if the fan is to be used only to exhaust air from an inclosure, the casing may be dispensed with, and the fan wheel mounted with its inlet end connecting with a tube or opening leading from the inclosure.

I claim as my invention:

1. A centrifugal fan wheel having a plurality of propelling blades each having a concaved front face and an angle of discharge at the tip of the blade which increases from the inlet end toward the opposite end of the blade.

2. A centrifugal fan wheel having a plurality of propelling blades each having a concaved front face and an angle of discharge at the tip of the blade and an angle of incidence at the heel of the blade each of which increases from the inlet end toward the opposite end of the blade.

3. A centrifugal fan wheel having a plurality of propelling blades each having substantially the form of a portion of the surface of a cone and being arranged with its tip edge lying substantially in a cylindrical surface co-axial with the axis of the wheel.

4. A centrifugal fan wheel having a plurality of propelling blades each having substantially the form of a portion of the surface of a cone and being arranged with its tip edge substantially coplanar with the axis of the wheel.

5. A centrifugal fan wheel having a plurality of propelling blades each having substantially the form of a portion of the surface of a cone and being arranged with its tip edge lying substantially in a cylindrical surface co-axial with the axis of the wheel and extending at an angle to the elements of the cone intersecting said edge.

6. A centrifugal fan wheel having a plurality of propelling blades each having substantially the form of a portion of the surface of a cone and being arranged with its tip edge lying substantially in a cylindrical surface co-axial with the axis of the wheel and its heel non-coplanar with said axis.

7. A centrifugal fan wheel having a plurality of propelling blades each having substantially the form of a portion of the surface of a cone and being arranged with its tip edge substantially coplanar with the axis of the wheel and its heel non-coplanar with said axis.

8. A centrifugal fan wheel having a plurality of propelling blades each having substantially the form of a portion of the surface of a cone and being arranged with its tip edge lying substantially in a cylindrical surface co-axial with the axis of the wheel and its heel edge lying substantially in a conical surface co-axial with the axis of the wheel, said tip and heel edges lying in different planes.

9. A centrifugal fan wheel having a plurality of propelling blades each having substantially the form of a portion of the surface of a cone and being arranged with its tip edge lying substantially in a cylindrical surface co-axial with the axis of the wheel, and with its heel edge non-coplanar with said axis, the inlet end of said heel leading the opposite end thereof.

10. A centrifugal fan wheel having a plurality of propelling blades each having substantially the form of a portion of the surface of a cone and being arranged with its tip edge substantially coplanar with the axis of the wheel, both the tip and heel edges of the blade being at an angle to the elements of the cone intersecting said edges.

11. A centrifugal fan wheel having a plurality of propelling blades each having substantially the form of a portion of the surface of a cone and being arranged with its tip edge lying substantially in a cylindrical surface co-axial with the axis of the wheel and coplanar with said axis, both the tip and heel edges of the blade being at an angle to the elements of the cone intersecting said edges.

12. A centrifugal fan wheel having a plurality of propelling blades each having substantially the form of a portion of the surface of a cone, the axis of which is oblique to the axis of the wheel, the tip edge of said blade lying substantially in a cylindrical surface co-axial with the axis of the wheel.

13. A centrifugal fan wheel having a plurality of propelling blades each having substantially the form of a portion of the surface of a cone, the axis of which is oblique to the axis of the wheel, the tip edge of said blade being substantially coplanar with the axis of the wheel and the heel edge of said blade being non-coplanar with the axis of the wheel.

14. A centrifugal fan wheel having a plurality of propelling blades each having substantially the form of a portion of the surface of a cone and being arranged with its tip edge lying substantially in a cylindrical surface co-axial with the axis of the wheel, said blade having an angle of discharge at its tip which increases from the inlet end of the blade toward the opposite end thereof.

15. A centrifugal fan wheel having a plurality of propelling blades each having substantially the form of a portion of the surface of a cone and being arranged with its tip edge substantially parallel to and coplanar with the axis of the wheel, said blade having an angle of discharge at its tip which increases from the inlet end of the blade toward the opposite end thereof.

16. A centrifugal fan wheel having a plurality of propelling blades each having substantially the form of a portion of the surface of a cone and being arranged with its tip edge lying substantially in a cylindrical surface co-axial with the axis of the wheel, said blade having an angle of incidence at the heel of the blade which increases from the inlet end of the blade toward the opposite end thereof.

17. A centrifugal fan wheel having a plurality of propelling blades each having substantially the form of a portion of the surface of a cone and being arranged with its tip edge lying substantially in a cylindrical surface co-axial with the axis of the wheel and with its heel edge lying substantially in a conical surface co-axial with said axis, said blade having an angle of incidence at the heel of the blade which increases from the inlet end of the blade toward the opposite end thereof.

18. A centrifugal fan wheel having a plurality of propelling blades each having substantially the form of a portion of the surface of a cone and being arranged with its tip edge lying substantially in a cylindrical surface co-axial with the axis of the wheel and with its heel edge lying substantially in a conical surface co-axial with said axis, said blade having an angle of discharge at the tip and an angle of incidence at the heel each of which increases from the inlet end of the blade toward the opposite end thereof.

19. A centrifugal fan wheel having a plurality of propelling blades each having substantially the form of a portion of the surface of a cone and being arranged with its tip edge substantially coplanar with the axis of the wheel, and with its heel edge non-coplanar with said axis and lying substantially in a conical surface co-axial with said axis, said blade having an angle of discharge at the tip and an angle of incidence at the heel each of which increases from the inlet end of the blade toward the opposite end thereof.

20. A centrifugal fan wheel having a plurality of propelling blades each of which increases in radial depth from the inlet end thereof toward the opposite end thereof and has a concaved forward face, said blade being arranged with its tip edge lying substantially in a cylindrical surface co-axial with the axis of the wheel and having an angle of discharge which increases from the inlet end of the blade toward the opposite end thereof.

21. A centrifugal fan wheel having a plurality of propelling blades each of which increases in radial depth from the inlet end thereof toward the opposite end thereof and has a concaved forward face, said blade being arranged with its tip edge substantially coplanar with the axis of the wheel and with its heel edge non-coplanar with said axis, said blade having an angle of discharge and an angle of incidence each of which increases from the inlet end of the blade toward the opposite end thereof.

Witness my hand, this 3rd day of February, 1914.

WILLIS H. CARRIER.

Witnesses:
H. C. RICE,
CARLOS CEBRIAN.

Copies of this patent may be obtained for five cents each, by addressing the "Commissioner of Patents, Washington, D. C."

It is hereby certified that in Letters Patent No. 1,166,659, granted January 4, 1916, upon the application of Willis H. Carrier, of Buffalo, New York, for an improvement in "Centrifugal Fans," errors appear in the printed specification requiring correction as follows: Page 1, line 83, after the word "blade" insert the clause *which is the angle between a tangent to the inner surface of the blade at the point of delivery and a tangent to the circle of revolution of that point on the side toward which the blade is moving;* same page, line 85, strike out all after the word "blade" to and including the word "moving," line 90; and that the said Letters Patent should be read with these corrections therein that the same may conform to the record of the case in the Patent Office.

Signed and sealed this 1st day of February, A. D., 1916.

[SEAL.]

J. T. NEWTON,
*Acting Commissioner of Patents.*

Cl. 230—11